United States Patent
Bogaerts et al.

[15] 3,670,584
[45] June 20, 1972

[54] VARIABLE SPEED RATIO TRANSMISSION

[72] Inventors: Leo C. Bogaerts; George W. Weinberger, both of Antioch, Ill.

[73] Assignee: Ammco Tools, Inc., North Chicago, Ill.

[22] Filed: Jan. 18, 1971

[21] Appl. No.: 107,307

[52] U.S. Cl. ................................................ 74/199, 74/216
[51] Int. Cl. ................................. F16h 15/08, F16h 55/34
[58] Field of Search ............... 74/199, 214, 216, 380, 384

[56] References Cited

UNITED STATES PATENTS

| | | | |
|---|---|---|---|
| 3,238,818 | 3/1966 | Heintz | 74/199 X |
| 3,246,532 | 4/1966 | Anderson et al. | 74/199 X |

Primary Examiner—Leonard H. Gerin
Attorney—Fidler, Bradley, Patnaude & Lazo

[57] ABSTRACT

The friction drive wheel of a variable speed ratio transmission for controlling the speed of a lathe crossfeed assembly includes teeth around its periphery that engage the teeth of driving pinion with which they re held in engagement by linkages pivotably connecting the centers of rotation of the driving pinion and the friction drive wheel so that the friction drive wheel remains engaged with the pinion as it is raised nd moved by a control knob to infinitely variable positions between two rotatable friction discs of a clutch. The friction discs are biased toward each other by a compression spring to grip the friction drive wheel at a location on its faces controlled by its position between them, whereby a lead screw that moves the crossfeed assembly and which is connected by a clutch to the friction discs is driven by the discs at an infinitely adjustable speed.

8 Claims, 3 Drawing Figures

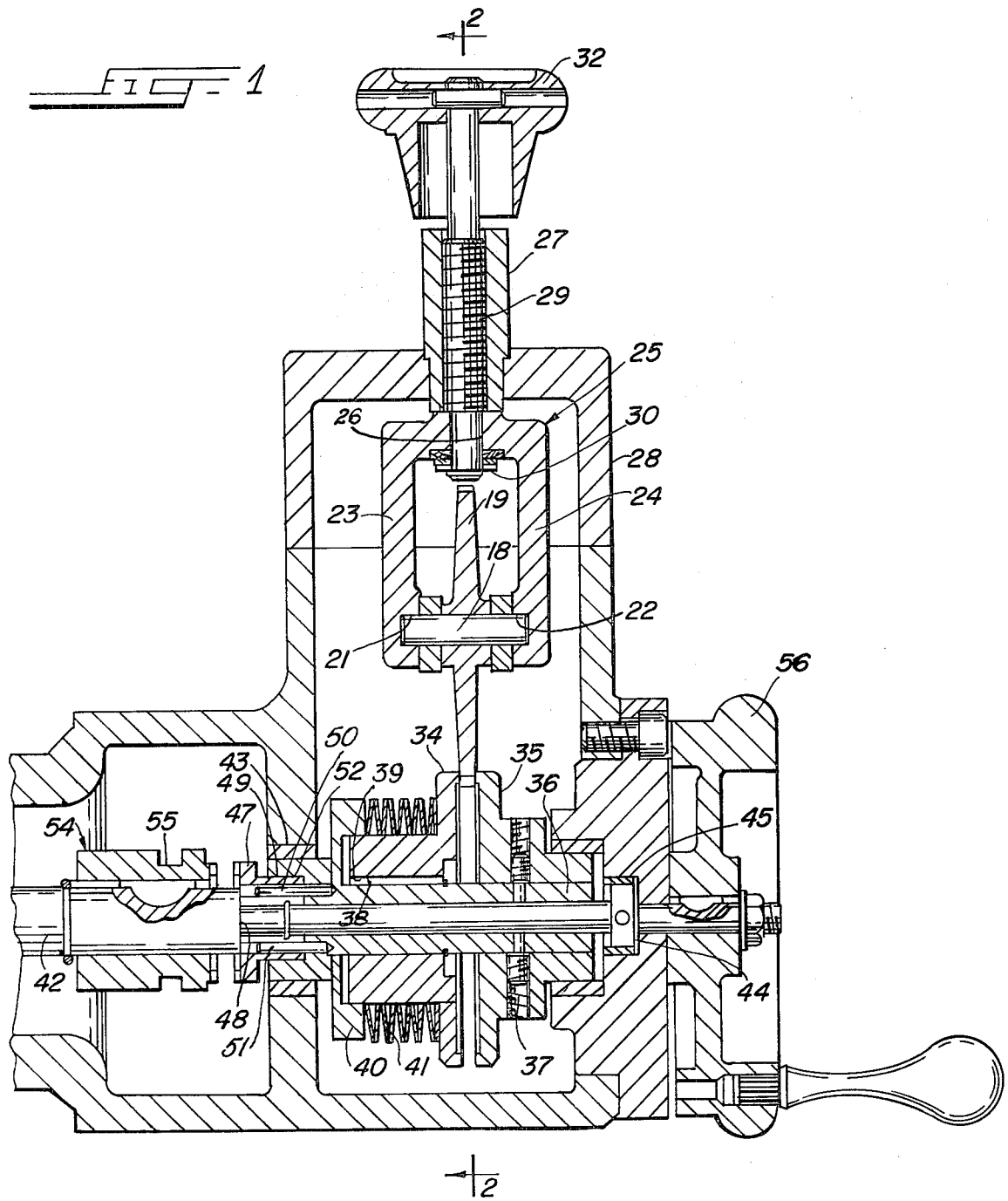

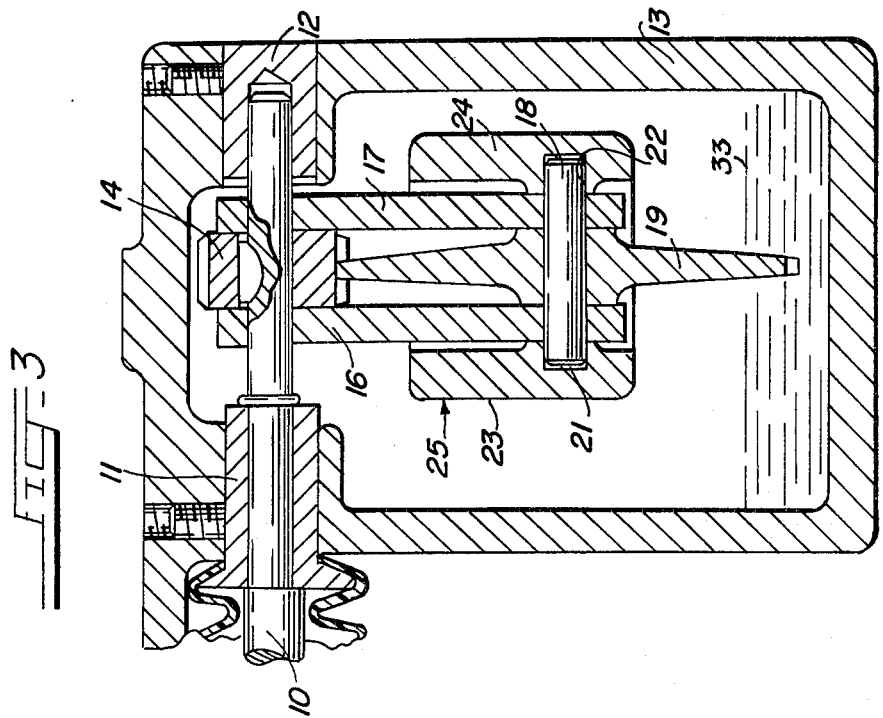
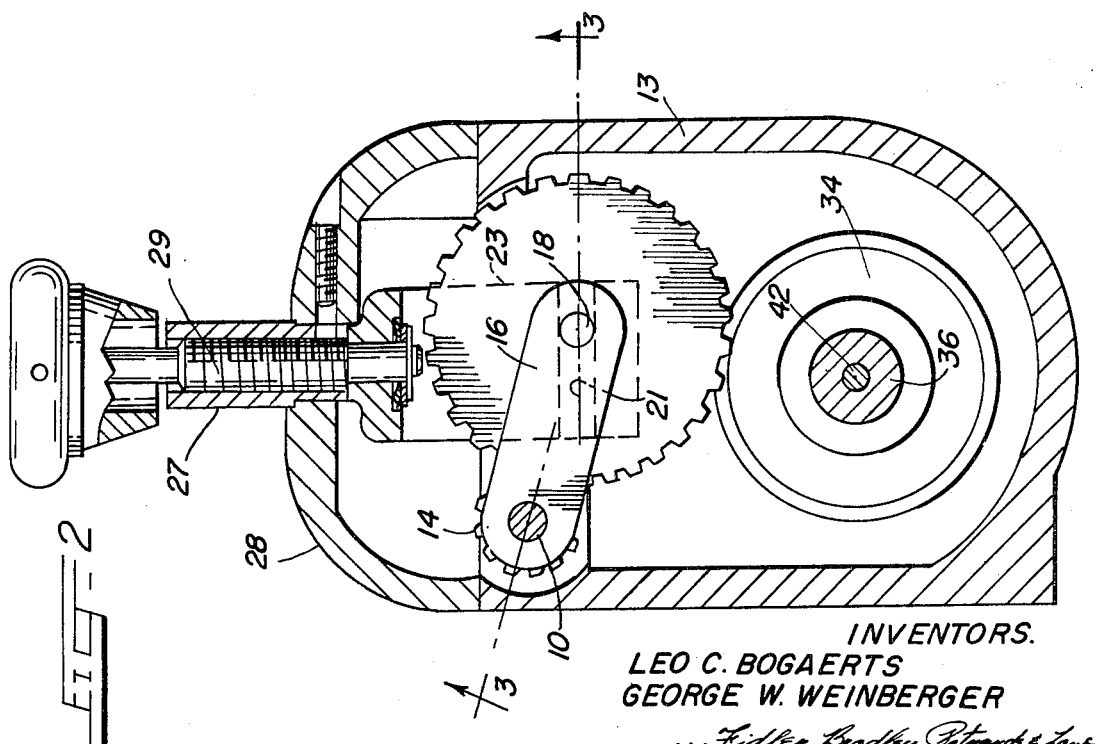

VARIABLE SPEED RATIO TRANSMISSION

This invention relates to infinitely variable speed ratio transmissions and more particularly it relates to such transmissions that are especially suitable for use in the crossfeed assembly of a lathe.

In one type of variable speed ratio transmission, a friction wheel is driven from a motor and engages clutch elements which grasp it at a selected location to provide a controllable speed clutch. The controllable speed clutch determines the final output velocity of a lead screw.

In the prior art this type of variable speed ratio transmission has not been used in a crossfeed assembly of a lathe but has been used for other purposes including the driving of the main spindle of a lathe in a longitudinal direction. Moreover, the prior art transmissions include a differential mechanism in which one of the differential gears is driven at a constant speed while the friction clutch varies the speed of an entirely different gear in the differential mechanism so that the output of the differential mechanism is the difference between speeds of the constant speed gear and the gear driven by the friction clutch.

The prior art variable speed ratio transmissions have the disadvantage of requiring a large number of moving parts. Because of the large number of moving parts, the prior art transmissions are expensive and require repair or replacement of parts more frequently than a simpler transmission.

Accordingly, it is an object of this invention to provide a new and improved variable speed ratio transmission.

It is a further object of the invention to provide a combination of a crossfeed assembly and variable speed ratio transmission for a lathe.

It is a still further object of this invention to provide an inexpensive variable speed ratio transmission of relatively simple construction.

It is a still further object of the invention to provide a new and improved variable ratio transmission in which a friction clutch drives a lead screw at a variable speed and is directly driven by a friction wheel element that rotates at a constant speed.

In accordance with the above and further objects of the invention, a variable speed ratio transmission is provided for the crossfeed mechanism of a lathe. The variable speed ratio transmission includes a friction drive wheel slidably and rotatably mounted within a fork, and additional friction clutch elements that cooperate with the friction drive wheel. The axle of the friction drive wheel is slidable in slots in the fork. The friction drive wheel includes teeth along its periphery which are held in engagement with the teeth of a drive pinion driven by the motor of the lathe by linkage arms which connect the axle of the drive pinion and the axle of the friction drive wheel at their centers of rotation. Accordingly, the friction drive wheel may be pivoted by axial movement of the fork yet remains in engagement with the pinion which rotates at a speed proportional to the speed of the spindle. A knob is connected to the fork and rotation thereof pivots shaft of the friction drive wheel to adjust the drive ratio between the spindle and the crossfeed assembly.

The friction clutch includes a pair of longitudinally fixed, rotatable friction discs connected by a clutch to a lead screw. One of the discs is spring biased toward the other. These discs have inwardly turned flanges facing each other between which the friction drive wheel extends. The friction drive wheel is moved so that the flanges of the friction discs grasp the faces of the wheel at a selected radius to adjust the speed ratio between the input drive shaft and the lead screw.

The friction discs rotate about the drive shaft and are keyed to a first clutch element. A second clutch element is keyed to the lead screw and moved into engagement with the first clutch element so that the friction discs drive the output shaft or lead screw of the crossfeed mechanism as they rotate.

The transmission is simple in construction with few moving parts and yet provides an infinitely variable speed ratio that may be adjusted to any value within its range by moving the friction drive wheel to the selected location between the friction discs.

The above and further features of the invention will be better understood from the following detailed description when considered with reference to the accompanying drawings in which:

FIG. 1 is a fragmentary sectional view of a speed ratio transmission embodying the present invention;

FIG. 2 is a sectional view taken along the line 2—2 of FIG. 1; and

FIG. 3 is a sectional view taken along the line 3—3 of FIG. 2.

Referring now to the drawings, an input shaft 10 (FIGS. 2 & 3) is adapted to be driven from the main drive of a lathe and is rotatably mounted in a pair of bearings 11 and 12 located in suitable holes in a housing member 13. A drive pinion gear 14 is keyed to the shaft 10 between a pair of arms 16 and 17 which are freely rotatable on the shaft 10. A jack shaft 18 is mounted in the arms 16 and 17 and a friction wheel 19 is rotatably mounted on the shaft 18 between the arms 16 and 17. The wheel 19 is provided with peripherally disposed gear teeth which mate with the teeth in the pinion 14.

As best shown in FIGS. 1 and 3, the ends of the jack shaft 18 are slidably supported in a pair of grooves 21 and 22 provided in the arms 23 and 24 of a fork member 25 having a hole 26 provided in the base portion thereof. An internally threaded bushing 27 is mounted in a housing cover 28 and an adjustment rod 29 is threaded therein and loosely extends into the hole 26 in the fork member 25 where it is secured by a suitable retaining ring 30. A knob 32 is pinned to the rod 29, and the bearing 27 and the adjacent surface of the knob 32 are provided with graduations indicating the distance of tool travel for each revolution of the spindle of the lathe. As illustrated in FIG. 3, the bottom portion of the housing 13 defines a sump in which a suitable oil bath 33 is provided and through which the friction wheel rotates.

The friction drive wheel 19 has tapered outer faces which are positioned between a pair of clutch discs 34 and 35 mounted on a hollow shaft 36. The disc 35 is fixed to the shaft 36 by set screws 37 and the disc 34 is slidably secured to the shaft 36 by a key 38 fixed to the shaft 36 and slidable in a groove 39 in the hub portion of the disc 34. A retainer 40 is mounted on the shaft 36 and a plurality of annular springs 41 are interposed between the retainer 40 and the disc 34 to resiliently bias the disc 34 toward the disc 35 to frictionally engage the faces of the drive wheel 19 between the discs 34 and 35.

The shaft 36 is rotatable on an output shaft 42 which may include an integral lead screw (not shown) for driving a suitable tool carried by the crossfeed assembly. The left-hand end of the hollow shaft 36 as shown in FIG. 1 is journalled in a bearing 43 and a thrust collar 44 pinned to the shaft 42 is journalled in a bearing 45.

A driving clutch member 47 is slidably mounted on the shaft 42 adjacent a shoulder 48 provided thereon and has a shank portion 49 slidably received in the end of the shaft 36. A pair of drive pins 50 and 51 are fixed in the bottom of a counterbore 52 in the shaft 36 and are slidably received in recesses in the clutch member 47. It may thus be seen that the shaft 36 on the entire assembly mounted thereon is axially slidable to maintain the friction wheel 19 and the friction discs 34 and 35 in alignment as the shaft 18 is pivoted toward the axis of the discs 34 and 35.

As best shown in FIG. 1, a driven clutch member 54 is slidably mounted on the output shaft 42 between a non-driving position, as shown, and a driving position in engagement with the driving clutch member 47. An annular groove 55 in the clutch member 54 is adapted to receive an adjustably movable pin (not shown) which extends through the housing 12 to permit clutching and declutching of the cross feed assembly.

In order to permit manual adjustment of the shaft 42, a hand wheel 56 is keyed to the end of the shaft 42 extending outside of the housing 12. Because of the frictional drive connection between the wheel 19 and the discs 34 and 35 it is possible to manually hold the hand wheel 56 stationary while the input shaft 10 is rotating.

OPERATION

In operation, the input shaft 10 is coupled to the friction wheel 19 by means of the pinion gear 14. The friction wheel 19 is in turn coupled to the discs 34 and 35 and thus to the output shaft or lead screw 42 when the clutch members 47 and 55 are engaged.

In order to adjust the rate at which the cross-feed assembly driven by the lead screw moves toward or away from the arbor, the knob 32 is rotated to move the axis of rotation of the friction wheel 19 closer to or farther away from the axis of rotation of the discs 34 and 35. Accordingly, the annular flanges on the discs 34 and 35 engage the friction wheel 19 at a manually selectable radius to drive the output shaft 42 at the desired proportional speed relative to that of the input shaft 10.

While the present invention has been described in connection with a particular embodiment thereof, it will be understood that those skilled in the art may make many changes and modifications without departing from the true spirit and scope of the invention. Therefore, by the appended claims it is intended to cover all such changes and modifications as come within the true spirit and scope of this invention.

What is claimed is:

1. An infinitely variable speed ratio transmission for use in a lathe, comprising
   a housing,
   an input shaft journaled in said housing,
   an output shaft journalled in said shaft in parallel with said input shaft,
   a drive pinion connected on said input shaft,
   a friction drive wheel having peripheral gear teeth mating with said drive pinion,
   a jack shaft rotatably mounting said drive wheel,
   fixed radius linkage means connected between said jack shaft and said input shaft for maintaining said friction wheel in mating engagement with said drive pinion,
   a support member adjustably mounted in said housing and provided with slots in which said jack shaft is slidably mounted, a screw fixedly connected to said support member and extending through said housing,
   adjustment means for axially moving said screw relative to said housing to move said support member and said jack shaft,
   a pair of friction discs resiliently biased against opposite faces of said friction wheel,
   means rotatably mounting said friction discs about the axis of said output shaft, and
   clutch means connected between said friction discs and said output shaft for controllably connecting said discs to said output shaft.

2. The invention set forth in claim 1, wherein said means rotatably mounting said friction discs comprises a hollow shaft rotatably mounted over said output shaft.

3. The invention set forth in claim 2 wherein said faces of said friction wheel converge toward the periphery of said wheel, and
   said friction discs are axially movable relative to said output shaft.

4. The invention set forth in claim 3 wherein said hollow shaft is axially shiftable along said output shaft.

5. The invention set forth in claim 4 wherein said clutch means comprises a first clutch element shiftable on said output shaft, and a clutch face on said hollow shaft.

6. The invention set forth in claim 1 wherein said support member comprises
   a fork having a pair of tines in which said slots are respectively disposed, and said adjustment means comprises
   a threaded bushing secured in said housing and threadedly receiving said screw and
   a control knob secured to said screw.

7. The invention set forth in claim 6 wherein an end of said output shaft extends from said housing, and a hand wheel fixedly mounted over said end of said output shaft.

8. The invention set forth in claim 7 wherein
   said output shaft is the lead screw of a crossfeed assembly for a lathe.

* * * * *